United States Patent [19]

Franken et al.

[11] 4,380,366
[45] Apr. 19, 1983

[54] DETACHABLE CONNECTOR FOR OPTICAL FIBRES

[75] Inventors: Adrianus J. J. Franken; Franciscus M. Coolen; Giok D. Khoe; Jacob Langerhorst; Henricus W. W. Smulders, all of Eindhoven, Netherlands

[73] Assignee: U.S. Philips Corporation, New York, N.Y.

[21] Appl. No.: 35,979

[22] Filed: May 4, 1979

[30] Foreign Application Priority Data

May 5, 1978 [NL] Netherlands ............... 7804825

[51] Int. Cl.³ .................................... G02B 7/26
[52] U.S. Cl. ........................................ 350/96.21
[58] Field of Search ............... 350/96.20, 96.21, 96.22

[56] References Cited

U.S. PATENT DOCUMENTS 3,936,143 2/1976 Sato ................................. 350/96.21
4,088,390 5/1978 McCartney ..................... 350/96.21
4,181,401 1/1980 Jensen ............................. 350/96.21
4,232,934 11/1980 Feinbloom ...................... 350/96.20

FOREIGN PATENT DOCUMENTS 52-77736 6/1977 Japan ............................. 350/96.21

Primary Examiner—John D. Lee
Attorney, Agent, or Firm—Marc D. Schechter

[57] ABSTRACT

A connector for connecting optical fibers comprises three portions:
a. centering means for centering the fiber with respect to a housing in which the fiber has been inserted,
b. a profiled edge on each housing for centering housings with respect to each other, and
c. fixing means for connecting two housings to each other.

The edges of the housings are resilient with respect to the rest of the housing so that reference faces of the connector can be pressed together by springing back the edges.

13 Claims, 13 Drawing Figures

DETACHABLE CONNECTOR FOR OPTICAL FIBRES

BACKGROUND OF THE INVENTION

The invention relates to an optical fiber connector comprising two connector portions, each of which comprises a housing with means for detachably connecting the connector portions to each other. Each connector portion also includes centering means, arranged in the housing, for centering the fiber ends to be connected with respect to each other, and a reference face for positioning an end face of a fiber end. The reference faces of the connector portions contact each other when the connection is made.

A connector of the kind described above is known from U.S. Pat. No. 3,936,143. The connector described and shown therein comprises centering means in each connector portion for centering the fibers to be connected with respect to each other. The centering means consists of a first bushing which is arranged in a housing and which is provided with an eccentric hole. A second bushing is provided in the eccentric hole, and another eccentric hole is provided in the second bushing. The optical fiber to be connected is arranged in the hole in the second bushing. By rotating the bushings with respect to the housing, the position of the fiber end (arranged in the second bushing) can be made to correspond to the position of the fiber end in the second connector portion. The bushings are then rotated until the light transmission from one fiber end to the other fiber end is as large as possible. At this point, the connection efficiency is optimum.

However, a drawback of the known connector is that a connector portion of a first connector cannot be combined with a connector portion of a second connector without requiring adjustment of the eccentric bushings for achieving the optimum connection efficiency. In order to achieve the optimum connection efficiency between two arbitrary connector portions, connection of the connector portions to each other must be followed by recentering of the fiber ends with respect to each other by means of the described centering procedure.

Moreover, the fiber ends are glued into the connector portions of the known connector, so that connector portions cannot be reused should one end face of a fiber end be damaged or should a fiber break. It is also to be noted that while centering the fibers with respect to each other, the contacting reference faces of the bushings move with respect to each other. This movement may damage the end face of a fiber end. Furthermore, during the connection of the connector portions to each other, the bushings can already move with respect to each other, which may also lead to damage. Moreover, the movement of the bushings over each other produces particles, as a result of wear, which have an adverse effect on the transmission of light between the two fiber ends, and hence on the connection efficiency.

Like many other connectors which have to be repeatedly attached and detached, the connector described in U.S. Pat. No. 3,936,143 comprises parts, such as the bushings, which are subject to wear, unless these parts are made of a durable and hence expensive material. This wear makes the centering of the fibers with respect to each other more difficult and inaccurate over the course of time.

SUMMARY OF THE INVENTION

It is an object of the invention to provide a connector which, once the fiber ends have been centered in the connector portions, can be assembled to each other without further aids or adjusting means, and can also be assembled from either connector portion to any other connector portion in which a fiber has previously been centered once. It is a further object to provide a connector which is insusceptible to temperature fluctuations and wear phenomena.

It is another object of the invention to provide a connector which can be inexpensively manufactured in bulk and which is suitable for repeated use, even in the cases of damaging or fracturing of a fiber end.

To these ends, the connector according to the invention includes a housing having a central axis which is directed perpendicular to the reference face. A profiled edge is formed on each housing, the edges of two housings engaging each other when the connector portions are connected to each other. In this manner, the central axes of the housings are centered, and the edges contact each other by way of faces along lines radiating from the central axis.

The centering means, for centering the fiber in the connector portion abuts on one side against the fiber end introduced into the connector portion and on the other side against an inner wall of the housing. The housing has as many symmetry planes as there are centering means. The central axis of the housing is situated in each symmetry plane and the profiled edge of the housing is arranged to be resilient with respect to the reference face in the direction of the central axis, so that the reference faces can be made to contact each other against the spring forces exerted by the edges.

The connector according to the invention is advantageous in that a fiber arranged in a connector portion is centered with respect to the inner wall of the housing. The profiled edges center the housing of the one connector portion with respect to the housing of the other connector portion so that the fibers are always centered with respect to each other. Furthermore, the reference faces are pressed against each other only after the two housings have been aligned.

The profiled edges assure that the reference faces will not rotate with respect to each other during or after mounting of the connector portions. This is advantageous because the formation of particles due to wear would have an adverse effect on the connection efficiency.

The profiled edges have no abutment faces which impede movement in a direction perpendicular to the central axis because the faces lie along lines radiating from the central axis. As a result, one edge can expand with respect to the other edge, for example, under the influence of temperature fluctuations. The housings remain centered with respect to each other because expansion takes place in direction perpendicular to the central axis.

Wear of the profiled edges will not disturb the centering either, because in that case the edges more deeply engage each other. This implies that a connector portion and parts thereof need not have absolute dimensional correspondence but merely a comparative dimensional correspondence (shape correspondence). Therefore, the connector according to the invention can be manufactured of, for example, synthetic materials by way of injection molding processes, so that the connector can be manufactured comparatively cheaply. Tolerances of the connector portions manufactured, for example, due to shrinking, are not objectionable. Expansion of parts of synthetic material, for example Teflon, as a result of the absorption of moisture from the surroundings is not objectionable either.

A further advantage of the connector according to the invention is that the connector portions need not all be made of one and the same material. This is because differences in expansion or shrinkage, for example due to differences in the temperature coefficients, are of no importance. For example, a connector portion for chassis mounting can be made of metal (brass) and a connecting connector portion can be made of a synthetic material (polycarbonate and other polymers suitable for injection molding processes). Furthermore, connector portions from different production series can be combined without loss of the favorable connection efficiency. It is known that comparative dimensional deviations tend to occur between portions manufactured in different production series.

It is to be noted that if the centering means for one connector portion need be very accurate, this can be realized without problem by simultaneously manufacturing or manufacturing in very rapid succession the centering means in one and the same production series.

An embodiment of a connector portion according to the invention is characterized in that the reference face is formed on the housing, and the central axis extends through an opening into the reference face. The housing has three circular-cylindrical recesses of the same dimensions extending in a longitudinal direction parallel to the central axis. The centers of the recesses are equidistant with respect to each other and with respect to the central axis. The distance between the central axis and each center is substantially equal to the radius of the circles. The recesses each accommodate cylindrical centering means which have a circular section which is ground to be flat on one side and which enclose a space having the shape of an equilateral triangular prism.

A preferred embodiment of the connector according to the invention includes a holder arranged in the housing to support the centering means. The holder has as many symmetry planes as the housing, is rotatable with respect to the housing, and is lockable with respect to the housing. The holder is provided with a channel which encloses the central axis of the housing and which opens into the reference face. The holder is also provided with recesses which open into the hole and which are equiangularly situated in the holder and extend in the direction of the central axis. The recesses accommodate the centering means. Parts of an inner wall of the housing, which are contacted by the centering means, are described by a number of arcs of circles whose centers are equidistantly situated on another circle whose center is situated on the central axis of the housing.

BRIEF DESCRIPTION OF THE DRAWINGS

FIG. 2b is a front view of a detail of a housing of a connector as shown in FIG. 1a.

FIG. 3a is a longitudinal sectional view and FIG. 3b is a front view of a holder for a connector as shown in FIG. 1a.

Figures 1A, 1B:
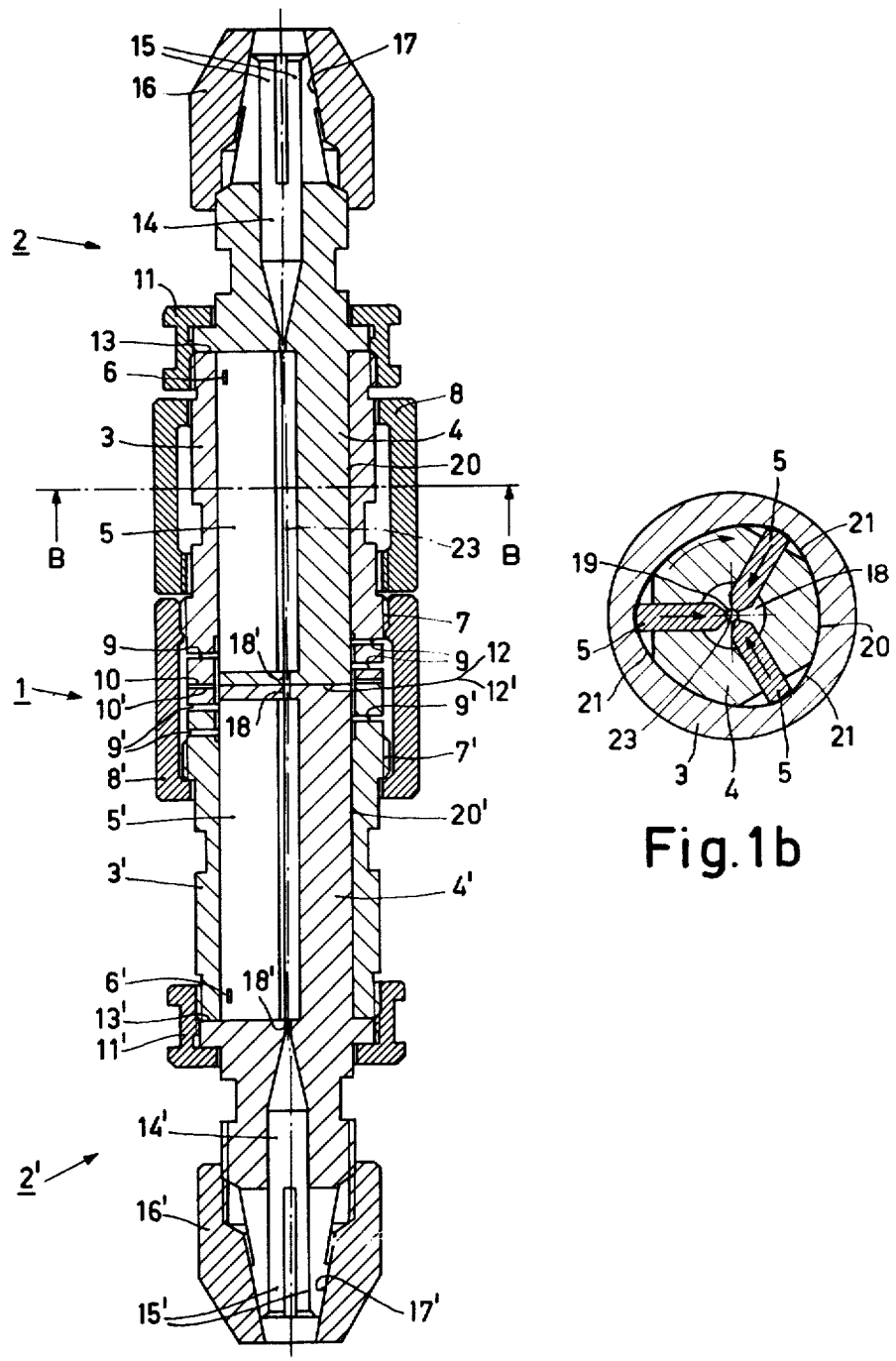
FIGS. 1a and 1b are sectional views of a preferred embodiment of a connector according to the invention.
Figure 5A:
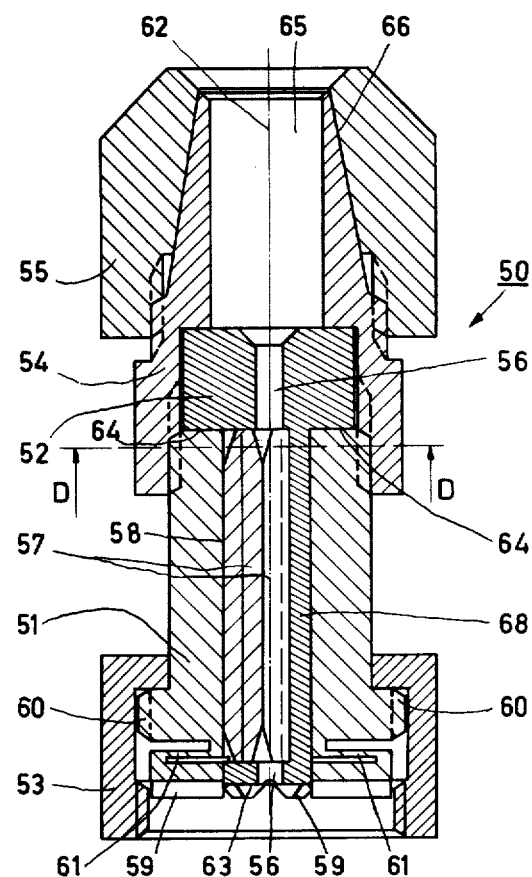
FIG. 5a is a longitudinal sectional view and FIG. 5b is a cross-sectional view of an embodiment of a connector portion according to the invention.
Figure 6A:
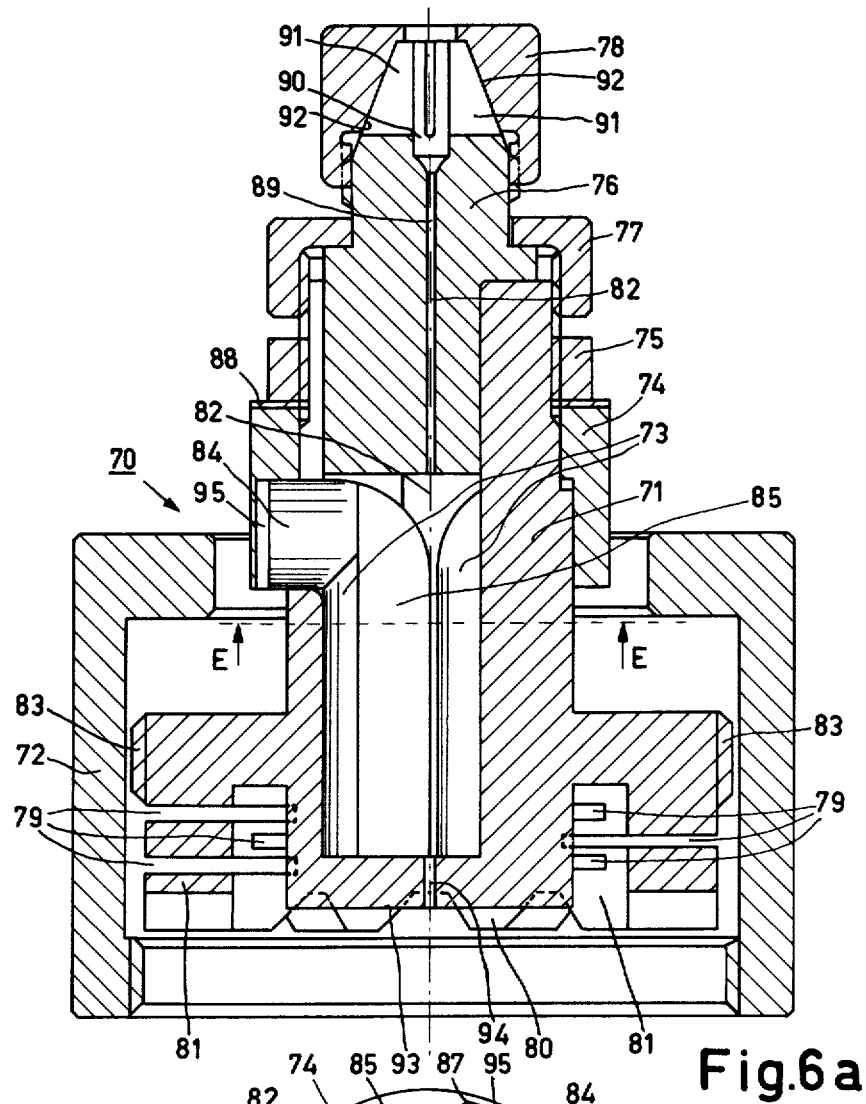
FIG. 6a is a longitudinal sectional view and FIG. 6b is a cross-sectional view of a further embodiment of a connector portion according to the invention.

It is to be noted that a connector can be made from two connector portions as shown in FIGS. 1a, 5a or 6a.

DESCRIPTION OF THE PREFERRED EMBODIMENTS

FIG. 1a is a sectional view of a preferred embodiment of a connector according to the invention. The connector 1 comprises two identical connector portions 2 and 2', each of which comprises a housing 3 and 3' and a holder 4 and 4'. In each holder is a centering means 5 and 5', each made up of three blades (centering elements). The centering means 5 and 5' are accommodated in the holders 4 and 4' with leaf springs 6 and 6', only one of which is shown in each connector portion 2 and 2'.

Each of the housings 3 and 3' is provided with a thread 7 and 7' for connecting the two housings 3 and 3' to each other with a cover 8 or 8'. The housings 3 and 3' are both provided with a cover 8 and 8' as well as with a thread 7 and 7'. Actually, one cover and one thread of the connector portion 2 and 2' are then superfluous. However, this redundancy offers the advantage that each connector portion can be readily connected to a further connector portion.

Each of the housings 3 and 3' is provided with slots 9 and 9'. These enable an edge 10 and 10', provided with a profile (not shown in this Figure), of the housing 3 and 3' to be elastically moved backward when the housings 3 and 3' are mounted on each other. As a result, first the housings 3 and 3' are centered with respect to each other, after which the housings 3 and 3' are drawn towards each other by screwing the cover 8 or 8' on the thread 7' or 7. The holders 4 and 4' are then pressed together by way of the reference faces 12 and 12', because the housings 3 and 3' are clamped against an abutment edge 13 and 13' of the holders 4 and 4' by a nut 11 and 11'.

The housing 3 and 3' is secured on the holder 4 and 4' after a fiber end (not shown in FIG. 1a for the sake of clarity) has been introduced into the holder 4 and 4' and has been clamped in a centered manner with respect to the housing 3 and 3'. Clamping of the fiber will be described in detail with reference to FIG. 1b. The holders 4 and 4' each have an inlet opening 14 and 14' which is enclosed by four resilient tongues 15 and 15'. An envelope, provided on an optical fiber for protection against mechanical and/or thermal loads, is introduced between the tongues 15 and 15' and is clamped there by tightening a clamping nut 16 and 16' which is provided with run-on faces 17 and 17' which cooperate with the tongues 15 and 15' for this purpose. The holders 4 and 4' are each provided with a channel which extends from the inlet opening 14 and 14' to the reference face 12 and 12' in order to accommodate an optical fiber. The channels 18 and 18', however do not serve for centering the fibers.

FIG. 1b is a sectional view, taken along line BB in FIG. 1a, which clearly illustrates how a fiber is centered with respect to the housing 3. In the holder 4 there are arranged three blades comprising centering means 5. The blades are pressed, by rotation of the holder 4 with respect to the housing, onto a fiber 19 accommodated in the channel 18. The channel 18 is deliberately shown to be very large with respect to the fiber 19.

For the purpose of clamping fiber 19 the housing 3 comprises a specially shaped inner wall 20 which is described by arcs of a circle 21 as shown in exaggerated form in FIG. 1b. The holder 4 bears against parts of the inner wall which are situated at the shortest distance from the fiber. The parts of the inner wall 20 which are contacted by the centering means 5 are arcs of a circle 21, the center of which is situated on a circle whose center is situated on a central axis 23 of the housing 3. When the holder 4 is rotated with respect to the housing 3, the blades of centering means 5 abut against the arcs of a circle 21 of the inner wall 20. The centering means 5 are thus forced towards the central axis 23 of the housing 3, with the result that the fiber 19 introduced into the holder 4 is centered with respect to the housing 3.

The fiber 19 is clamped between the centering means 5 which are clamped by the housing 3 and the holder 4. The housing 3 is then pressed against the abutment edge 13 of the holder 4 and is secured by means of the nut 11, so that the fiber 19 remains centered and clamped with respect to the housing 3.

In order to bring the fiber 19 exactly far enough into the holder 4, so that an end face of the fiber coincides with the reference face 12 of the holder 4, the connector portion 2 is secured to a reference connector portion. The reference connector portion (not shown) is substantially identical to the connector portion 2, but the holder 4 is not provided with a channel 18. The fiber is slid into the holder 4 until the end face thereof abuts against the reference face of the reference connector portion. Subsequently, the fiber is centered and clamped, so that, after removal of the reference connector portion, the fiber can be connected to a fiber similarly secured in a second connector portion 2'.

The housing 3 has a profiled edge which, in cooperation with the profiled edge 10' of the housing 3' aligns and centers the housings 3 and 3' with respect to each other, so that the central axis 23 of the housing 3 is aligned with the central axis 23' of the housing 3'.

When the cover 8' is tightened on the thread 7, the housings 3 and 3' are elastically deformed at the area of the slots 9 and 9'. As a result, the reference faces 12 and 12' are drawn towards each other and are pressed one onto the other. The fibers introduced into the holders 4 and 4', and clamped by the centering means 5 and 5', are then centered with respect to each other and are separated by the desired distance.

Figure 2C:
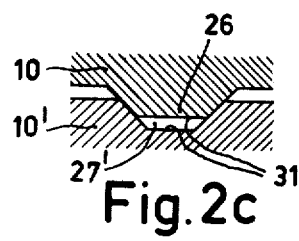
FIGS. 2a and 2c are sectional views.
Figure 2A:
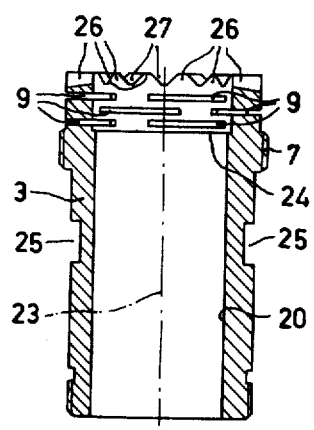

FIG. 2a is a sectional view of the housing 3 of FIG. 1a. The edge 10 of housing 3 is provided with a profile as shown. Between the thread 7 and the edge 10, a part of the housing 3 is provided with slots 9 so that the part obtains the desired resilience in the direction of the central axis 23 of the housing 3, but remains rigid in a direction perpendicular thereto. The housing 3 is provided on two sides with slots 25 which extend perpendicularly to the plane of the drawing and which can be engaged by a spanner during mounting and removal of the connector shown in FIG. 1.

Figure 2B:
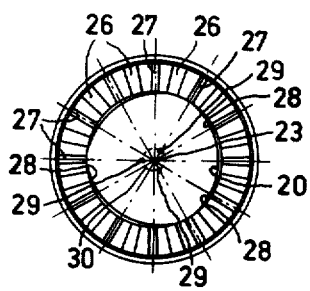

FIG. 2b is a front view of the housing 3. The profiled edge 10 has a ring-like arrangement of teeth 26 and recesses 27 for centering the housing 3 with respect to the housing 3'. The inner wall 20 of the housing 3 is described by three arcs of a circle 28. The center 29 of the arcs are situated on a circle 30 whose center is situated on the central axis 23 of the housing 3, as shown in FIG. 2a.

FIG. 2c is a side elevation of a portion of engaging edges 10 and 10'. A tooth 26 engages a recess 27' and bears on faces, each of which enclose an acute angle with the central axis 23 of the housing 3. According to the invention, the faces 31 may not contact each other, because this will cause play due to wear in the course of time, with the result that the housings 3 and 3' become off-centered with respect to each other.

Figure 3A:
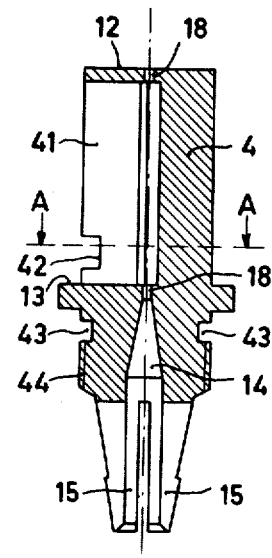
Figure 3B:
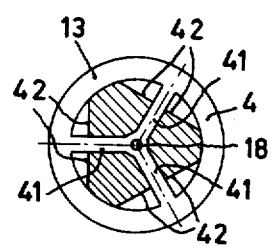

FIG. 3a is a longitudinal sectional view and FIG. 3b is a cross-sectional view of a holder 4 which comprises the reference face 12, the abutment edge 13, the inlet opening 14, the tongues 15, and channel 18, and thread 44 for securing the clamping nut 16 (FIG. 1a). In the holder 4 three slots 41 are recessed in which the blades of the centering means 5 are accommodated. The slots 41 open one into the other and face the channel 18. A fiber end to be introduced into the channel 18 will, therefore, be slid between the three blades of centering means 5.

The holder 4 further comprises three supporting faces 42 for supporting leaf springs 6 (FIG. 1a) which bears the blades of the centering means 5 outside the channel 18 when the fiber is not clamped by the centering means. The cross-sectional view shown in FIG. 3b is taken along the line A—A in FIG. 3a.

The holder 4 further comprises (shown in FIG. 3a) recesses 43 which extend perpendicularly to the plane of the drawing and in which a spanner can be positioned for clamping a fiber envelope by means of a clamping nut 16 (FIG. 1a) to be fitted on the tongues 15.

Figure 4A:
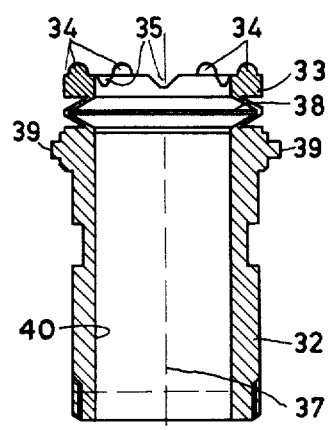
FIGS. 4a and 4b are sectional views of a further embodiment of a housing of a connector according to the invention.
Figure 4B:
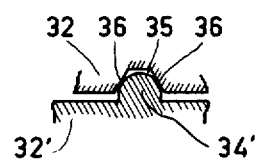

FIG. 4a is a sectional view of a further embodiment of a housing 32 for a connector according to the invention. The profiled edge 33 is formed by spherical protrusions 34 and tooth-shaped recesses 35. FIG. 4b is a view of a detail which shows how a spherical protrusion 34' engages a tooth-shaped recess 35. The oblique faces 36 of the tooth-shaped recess 35 serve as an abutment face and each enclose an acute angle with a central axis 37 of the housing 32 as shown in FIG. 3a. The profiled edge 33 connects with a V-shaped ring 38 which is elastic in the direction of the central axis 37. The ring 38, however, is rigid in directions perpendicular to the central axis 37. Consequently, the edge 33 is compressed when the housing 32 is connected to another housing having a similarly profiled edge. The housings may be connected to each other, instead of by thread 7 and cover 8 as in FIG. 1a, by way of pins 39 of a bayonet connector.

The housing 32 has an inner wall 40 which has a shape which is identical to that of the inner wall 20 of the housing 3 of FIG. 2b. Furthermore, instead of using a V-shaped ring 38, one may use a ring (not shown) in the form of a W or a bellows.

FIG. 5a is a sectional view of an embodiment of a connector portion 50 for a connector according to the invention. A connector comprises two identical connector portions. The connector portion 50 comprises a housing 51, a holder 52, a fixing cover 53, a lock nut 54 and a clamping spring 55. The holder 52 has a passage 56 which is bounded by three circular-cyclindrical rods 57. The rods 57 have the same function as the blades of the centering means 5 of FIGS. 1a, 1b. Thus, the housing 51 has an inner wall 58 having the same shape as the inner wall 20 of the housing 3 (see FIGS. 1b and 2b). Furthermore, like the housing 3 (see FIGS. 1b and 2b), the housing 51 has a thread 60 and an edge 59 in the form of a toothed ring. Between the edge 59 and the remainder of the housing 51, a diaphragm 61 is formed, so that the edge 59 is resilient in the direction of the central axis of the housing 51.

When the holder 52 with the rods 57 is rotated with respect to the housing 51, an optical fiber can be clamped between the rods 57, so that the fiber is centered with respect to the housing 51. At the edge 59, the holder 52 has a reference face 63. At its other end, the holder 52 is provided with an abutment face 64. After centering the fiber introduced into the holder 52, the housing 51 is clamped against the abutment face 64 by means of a lock nut 54. The lock nut 54 has an inlet opening 65 in which an envelope of an optical fiber can be clamped. Using the clamping nut 55, the run-on faces 66, formed externally on the lock nut 54 and internally on the clamping nut 55, can be pressed together in order to clamp the fiber envelope.

Figure 5B:
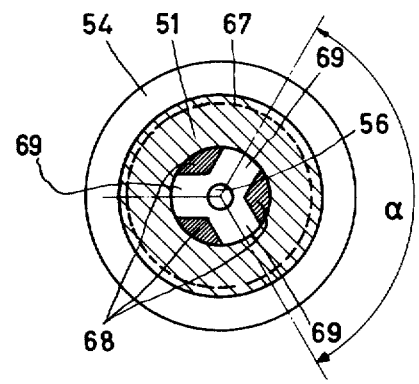

FIG. 5b is a sectional view of the connector portion 50 of FIG. 5a, taken along the line of FIG. 5a D—D. The housing 51, the lock nut 54 and the passage 56 can be seen in this view. The circumference 67 of the abutment face 64, and three supports 68 of the holder 52 which bound recesses 69 are also shown in this sectional view. The rods 57 are accommodated in the receses 69. The angle α between the center lines of the recesses 69 is 120°. The rods 57 in holder 52 are not shown in FIG. 5b for the sake of clarity.

Figure 6B:
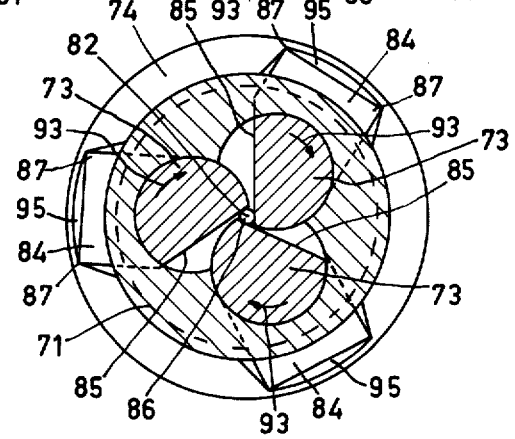

FIG. 6a is a longitudinal sectional view and FIG. 6b is a cross-sectional view of a further embodiment of a connector portion 70 of a connector according to the invention. FIG. 6b is a cross-sectional view of the connector portion 70 of FIG. 6a, taken along the line E—E.

A housing 71, a fixing cover 72, centering rods 73, a centering ring 74, a lock ring 75, a filler 76, a fixing nut 77 and a clamping nut 78 are shown in the sectional view of FIG. 6a. The housing 71 is provided with slots 79 so that the edge 81, provided with teeth 80, is resilient in the direction of the central axis 82 of the housing 71.

The housing 71 is also provided with a threaded edge 83 whereby, in conjunction with a fixing cover of a second, similar connector portion, two connector portions can be connected to each other. Similarly, the fixing cover 72 of the connector portion 71 and a threaded edge of a second connector portion can be used for this purpose.

In the housing 71 there are arranged three centering rods 73 which at one end have a portion 84 which is directed perpendicularly to the central axis 82. Furthermore, the centering rods 73 are ground to be flat on one side 85 (FIG. 6b). An optical fiber 86 is located and clamped by the three flat sides 85 by rotation of the centering rods 73 in the direction denoted by arrows 93.

Centering ring 74 is provided with recesses 95, in which the portions 84 fit, so that rotation of the centering ring 74 with respect to the housing 71 results in a simultaneous and equal rotation of the centering rods 73. Because centers of rotation about which the centering rods 73 are rotated do not coincide with the center of rotation of the centering ring 74, corners 87 of the portions 84 engage the recesses 95 in the centering ring 74. In order to permit a rotation of the ends 84 and the centering ring 74, the recesses 95 are designed to be tapered towards the central axis 82. Furthermore, the centering ring 74 is thin and elastic at the area of the recesses 95.

The flat sides 85 of centering rods 73 enclose an equilateral triangle and, in the absence of a fiber 86 in channel 94, they will contact each other on the central axis 82 when the centering rods 73 are rotated sufficiently. After clamping the fiber 86 between the flat sides 85, the portions 84 of the centering rods 73 are clamped between the housing 71 and the centering ring 74 by tightening the lock ring 75. In order to prevent rotation of the centering ring 74 while tightening the lock ring 75, an intermediate sliding ring 88 is provided.

The filler piece 76 is secured in the housing 71 by means of the fixing nut 77. The filler piece is provided with a through hole 89 which on one side opens into a space which is enclosed by the flat sides 85 of the centering rods 73. An optical fiber 86 (FIG. 6b) can be simply introduced between the centering rods 73 via the inlet opening 90 and the hole 89. The inlet opening 90 is enclosed by tongues 91 on which run-on faces 92 are formed. In cooperation with the clamping nut 78 and the run-on faces 92, an envelope of an optical fiber introduced into the inlet opening 90 is clamped by the tongues 91.

A fiber should be slid into the housing 71, via the inlet opening 90 and the hole 89, until the end face of the fiber coincides with the reference face 93 which is formed on the housing 71. For this purpose, housing 71 is provided with a channel 94 which is situated substantially along central axis 82.

Obviously, the reference faces of the connector portions 2, 2' and 50 of FIGS. 1a and 5a may also be formed on the housing 3, 3' and 51. The holders 4, 4' and 52 should then be shorter accordingly.

We claim:

1. A connector for coupling optical fibers comprising two connector portions, each connector portion comprising:

a housing, with means for detachably connecting the housing to another housing, said housing having an inner wall, a central axis and a reference face oriented perpendicular to the central axis, said reference face contacting the reference face of another housing when the connector portions are connected, said housing also having an edge having a toothed profile for engaging a toothed edge of another housing when the connector portions are connected, each of the toothed edges having faces along which the housings contact each other, said faces being along lines which radiate from the central axis, the central axes of the connected housings being coaxial; and centering means, arranged in the housing, for disengageably centering a fiber end with respect to a fiber end in the other connector portion, said centering means comprising at least one centering element having a first side arranged to abut against at least one side of the fiber end and having a second side arranged to abut against the inner wall of the housing;

characterized in that;

the inner wall of the housing has as many symmetry planes as there are centering elements, the central axis being situated in each symmetry plane; and the toothed edge is arranged to be resilient with respect to the reference face in a direction parallel to the central axis.

2. A connector as claimed in claim 1, characterized in that the edge having a toothed profile comprises a ring of teeth.

3. A connector as claimed in claim 2, characterized in that the toothed edge comprises spherical teeth and trapezoidal notches.

4. A connector as claimed in claim 3, characterized in that the end of the housing near the toothed edge is elastically deformable in a direction parallel to the central axis.

5. A connector as claimed in claim 4, characterized in that the elastically deformable part of the housing comprises a diaphragm.

6. A connector as claimed in claim 1, 2, 3, 4, or 5, characterized in that the centering means further comprises a holder which supports the centering elements in the housing, the holder having as many symmetry planes as the housing, the holder being lockably rotatable around the central axis in the housing.

7. A connector as claimed in claim 6, characterized in that the reference face is at an end of the holder which is near the toothed edge of the housing.

8. A connector as claimed in claim 7, characterized in that:
   the holder has a channel surrounding the central axis, said channel opening into the reference face;
   the holder is provided with recesses which extend in the direction of the channel and which open into the channel, said recesses being disposed equiangularly around the channel, a centering element being accommodated within each recess; and
   the inner wall of the housing is described by two or more arcs of circle, the centers of which are equidistantly disposed on a circle whose center is on the central axis, the length of the radius of the circle whose center is on the central axis being shorter than the radii of the arcs.

9. A connector as claimed in claim 8, characterized in that the holder is provided with three recesses.

10. A connector as claimed in claim 9, characterized in that the recesses are shaped like slots and the centering elements are shaped like blades.

11. A connector as claimed in claim 10, characterized in that each centering element is spring-biased toward the inner wall of the housing.

12. A connector for coupling optical fibers comprising two connector portions, each connector portion comprising:
   a housing, with means for detachably connecting the housing to another housing, said housing having an inner wall, a central axis and a reference face oriented perpendicular to the central axis, said reference face contacting the reference face of another housing when the connector portions are connected, said housing also having an edge having a toothed profile for engaging a toothed edge of another housing when the connector portions are connected, each of the toothed edges having faces along which the housings contact each other, said faces being along lines which radiate from the central axis, the central axes of the connected housings being coaxial; and
   centering means, arranged in the housing, for disengageably centering a fiber end with respect to a fiber end in the other connector portion, said centering means comprising at least one centering element having a first side arranged to abut against at least one side of the fiber end and having a second side arranged to abut against the inner wall of the housing;
   characterized in that;
   the inner wall of the housing has as many symmetry planes as there are centering elements, the central axis being situated in each symmetry plane;
   the toothed edge is arranged to be resilient with respect to the reference face in a direction parallel to the central axis; and
   the centering means further comprises:
   a holder having three circular-cylindrical recesses each having a radius of a first length and each having an axis of a second length, the axes of the recesses being parallel to the central axis and equidistant therefrom, the distance between the axes of the recesses and the central axis being a small amount less than the radii of the recesses; and
   three substantially circular-cylindrical centering elements, one centering element provided in each recess, each centering element having a flat side disposed toward the central axis, the centering elements forming a channel having a triangular cross-section around the central axis.

13. A connector as claimed in claim 12, characterized in that:
   each centering element has an end portion which is oriented perpendicular to the central axis; and
   the connector further comprises a centering ring which is lockably rotatable around the central axis with respect to the housing, said centering ring engaging the perpendicular end portion of each centering element such that rotation of the centering ring causes each centering element to rotate around the axis of the recess in which it is accommodated.

* * * * *